United States Patent Office 3,088,971
Patented May 7, 1963

3,088,971
METAL THIOSULFATES AS STABILIZERS IN VINYLARYL SULFONATES
Leonard A. Mattano and Charles E. Grabiel, Midland, Mich., assignors to The Dow Chemical Company, Midland, Mich., a corporation of Delaware
No Drawing. Filed May 27, 1960, Ser. No. 32,135
4 Claims. (Cl. 260—505)

This invention relates to stabilized compositions of vinyl-aryl sulfonic acids and salts thereof. More particularly, it concerns inhibiting such monomers against premature polymerization by the addition thereto of a small quantity of a material of the group of alkali metal, alkaline earth metal and ammonium thiosulfates.

Vinyl-aryl sulfonic acids and salts thereof are subject to polymerization induced by natural peroxides formed within the monomers or solutions thereof by absorbed oxygen. The usefulness of the monomers or their effectiveness in desired polymerization or copolymerization reactions can thus be reduced or completely destroyed. Though protective measures taken during the manufacture of these monomers to minimize polymerization are effective in maintaining monomer losses due to peroxide-induced polymerization at relatively low levels, more efficient means of preventing such losses are desirable. Monomer losses that occur during storage as a result of such polymerization also must be prevented in order to provide time for handling that is necessary in commercial utilization.

It is the principal object of this invention to provide inhibited monomer compositions of vinyl-aryl sulfonic acids and salts thereof which are stable against monomer losses or polymerization that is induced by naturally occurring peroxides. Other objects will become apparent as the invention is hereinafter more fully described.

In accordance with the present invention, it has been discovered that a stabilized monomer composition of a vinyl-aryl sulfonic acid or salt thereof can be prepared by incorporating a small quantity of a material selected from the group consisting of alkali metal, alkaline earth metal and ammonium thiosulfates into the monomer composition at any one of several convenient stages in its preparation and utilization.

Vinyl-aryl sulfonic acids or salts thereof that can be stabilized in accordance with the present invention include those for which preparative methods are taught in Mock, United States Letters Patent 2,821,549. Specifically, the monomers, contemplated by the present invention, are styrene sulfonic acids, vinyl-naphthalene sulfonic acids, the alkali metal, alkaline earth metal and ammonium salts thereof and the halo and alkyl ring substituted derivatives thereof. Exemplary compounds are sodium styrene sulfonate, potassium styrene sulfonate, lithium styrene sulfonate, ammonium styrene sulfonate, calcium styrene sulfonate, barium styrene sulfonate, sodium vinyl-chlorobenzene sulfonate, sodium vinyl-bromobenzene sulfonate, potassium vinyltoluene sulfonate, potassium vinylmesitylene sulfonate, sodium vinylxylene sulfonate, sodium vinyl-ethylbenzene sulfonate, sodium vinyl-diethylbenzene sulfonate, potassium vinyl-chlorotoluene sulfonate, potassium vinylnaphthalene sulfonate, sodium vinyl-chloronaphthalene sulfonate, sodium vinyl-dichloronaphthalene sulfonate, potassium vinyl-methyl-naphthalene sulfonate and the like substituted and unsubstituted vinyl-aryl sulfonates.

Preferably, the thiosulfate that is used is added to the vinyl-aryl sulfonic acid or salt thereof during its manufacture or shortly thereafter. Satisfactory results are obtained by incorporating the thiosulfate into the haloethyl substituted aryl sulfonic acids of Mock supra, just prior to the dehydrohalogenation step. Subsequently, it is desirable to add this inhibitor to the monomer after it has been purified by a process such as recrystallization which removes some portion of the initially available inhibitor. It may also be desirable to make incremental additions of the thiosulfate inhibitor, especially in aqueous solutions of the monomer after long periods of storage.

Thiosulfates that can be employed in the present invention include the alkali metal, alkaline earth metal and ammonium thiosulfates. The amount of a thiosulfate that can be effectively employed in the present invention varies from about 0.05 to about 2.0 percent of the vinyl-aryl sulfonate monomer and preferably the amount employed is from about 0.1 to about 1.0 percent of the monomer, the percentages being based on the weight of the monomer.

By way of further illustration of the present invention, a quantity of the crude aqueous sodium styrene sulfonate product obtained from the dehydrohalogenation step of the Mock process was adjusted to a pH of 7.1 by the addition of dilute sulfuric acid. Five hundred grams of this solution which contained 9.08 weight percent of sodium styrene sulfonate was charged to each of two flasks. To one flask was added 0.1040 gram (0.23 weight percent) anhydrous sodium thiosulfate, the percentage being based on the weight of the sodium styrene sulfonate monomer. The second flask was kept untreated to serve as a check. The treated and untreated monomer solutions were then heated and maintained at 60° C. for a period of 3 hours during which time the solutions were continuously stirred and blown with nitrogen by means of a gas sparger located below the surface of the liquid in the flask. After the specified period of time, the contents of the flasks were quantitatively analyzed for active monomer. The results obtained are reported in Table I, which records the percent of the monomer remaining in solution after specified periods of time had elapsed.

Table I

| System Inhibitor | Sodium Styrene Sulfonate Solution | Percent Original Monomer | Percent Monomer Remaining After— | |
|---|---|---|---|---|
| | | | 1.5 hrs. | 3.0 hrs. |
| None (Check) | 500 | 9.08 | 8.30 | 6.75 |
| Na$_2$S$_2$O$_3$ .23 wt. percent | 500 | 9.08 | 8.75 | 8.47 |

In a manner similar to that of the foregoing operation, potassium thiosulfate in an amount equal to 0.276 weight percent based on the weight of the monomer was employed as the inhibitor for a solution of sodium styrene sulfonate containing 9.05 percent original monomer. After 1.25 hours, 9.0 percent of monomer remained in the inhibited solution as compared to 8.49 percent remaining in the check solution. After 20.75 hours, 8.98 percent of monomer remained in the inhibited solution while only 8.23 percent remained in the check solution. After 22.75 hours, 0.6 gram of peroxidized sodium styrene sulfonate was added as a catalyst to each of the inhibited and control solutions. After 27.75 hours, 8.67 percent of monomer remained in the inhibited solution while only 6.73 percent remained in the control solution.

In further operations similar to the foregoing, materials of the group of sodium potassium, lithium, calcium, barium and ammonium thiosulfate are added to other vinyl-aryl sulfonic acids and salts thereof such as sodium styrene sulfonate, potassium styrene sulfonate, lithium styrene sulfonate, ammonium styrene sulfonate, calcium styrene sulfonate, barium styrene sulfonate, sodium vinyl-chlorobenzene sulfonate, sodium vinyl-bromobenzene sulfonate, potassium vinyltoluene sulfonate, sodium vinyltoluene sulfonate, potassium vinylmesithylene sulfonate, sodium vinyl-xylene sulfonate, sodium vinyl-ethylbenzene sulfonate, sodium vinyl-diethylbenzene sulfonate, potassium vinyl-chlorotoluene sulfonate, potassium vinyl-naphthalene sulfonate, sodium vinyl-chloronaphthalene sulfonate, sodium vinyl-dichloronaphthalene sulfonate, potasisum vinyl-methylnaphthalene sulfonate and the like substituted and unsubstituted vinyl-aryl sulfonates to achieve equally effective stabilization thereof.

We claim:

1. A composition of matter comprising a monomer selected from the group consisting of styrene sulfonic acid and vinyl naphthalene sulfonic acid, their alkali metal, alkaline earth metal and ammonium salts and chloro, bromo, methyl and ethyl ring substituted derivatives of such acids and salts; and from about 0.05 to about 2 percent of a material, based on the weight of the monomer, selected from the group consisting of alkali metal, alkaline earth metal and ammonium thiosulfates.

2. A composition of matter comprising sodium styrene sulfonate and from about 0.05 to about 2.0 percent of a material selected from the group consisting of alkali metal, alkaline earth metal and ammonium thiosulfates based on the weight of the sodium styrene sulfonate.

3. A composition of matter comprising potassium styrene sulfonate and from about 0.05 to about 2.0 percent of a material selected from the group consisting of alkali metal, alkaline earth metal and ammonium thiosulfates based on the weight of the potassium styrene sulfonate.

4. A composition of matter comprising an aqueous solution of an alkali metal styrene sulfonate and from about 0.05 to about 2.0 percent of a material selected from the group consisting of alkali metal, alkaline earth metal and ammonium thiosulfates based on the weight of the alkali metal styrene sulfonate.

No references cited.